United States Patent [19]

Bender et al.

[11] Patent Number: 4,909,686
[45] Date of Patent: Mar. 20, 1990

[54] PYROTECHNICAL DOWEL

[75] Inventors: Richard Bender, Lauf; Anton Bretfeld, Fürth; Axel Homburg, Taunusstein, all of Fed. Rep. of Germany

[73] Assignee: Dynamit Nobel AG, Troisdorf, Fed. Rep. of Germany

[21] Appl. No.: 261,886

[22] Filed: Oct. 25, 1988

Related U.S. Application Data

[63] Continuation-in-part of Ser. No. 41,543, Apr. 23, 1987.

[30] Foreign Application Priority Data

Apr. 23, 1986 [DE] Fed. Rep. of Germany ....... 3613624

[51] Int. Cl.⁴ .............................................. F16B 31/12
[52] U.S. Cl. ...................................... 411/20; 411/501; 411/19; 29/421.2; 72/706
[58] Field of Search ..................... 411/19, 20, 501–504; 29/421.2, 524.1; 72/706

[56] References Cited

U.S. PATENT DOCUMENTS

| 1,400,401 | 12/1921 | Allan | 411/20 |
| 2,378,118 | 6/1945 | Widrich | 411/20 |
| 2,492,590 | 12/1949 | Nofzinger | 411/19 |
| 3,332,311 | 7/1967 | Schulz | 411/20 |
| 3,396,623 | 8/1968 | Willis | 411/20 |
| 4,511,296 | 4/1985 | Stol | 411/20 |

FOREIGN PATENT DOCUMENTS

| 1683288 | 2/1971 | Fed. Rep. of Germany | 411/20 |
| 2641588 | 3/1978 | Fed. Rep. of Germany | |

*Primary Examiner*—Gary L. Smith
*Assistant Examiner*—Suzanne L. Dino
*Attorney, Agent, or Firm*—Antonelli, Terry & Wands

[57] ABSTRACT

A pyrotechnical dowel has a shank and a deformation chamber located at the forward end of the shank. The chamber contains a blasting cap. Triggering of the blasting cap takes place from the rearward end of the shank by means of a triggering tool which is introduced into a longitudinal duct within the shank and which comes into direct contact with a bottom of the blasting cap.

4 Claims, 2 Drawing Sheets

PYROTECHNICAL DOWEL

This application is a continuation-in-part of application of Ser. No. 041,543, filed Apr. 23, 1987.

BACKGROUND OF THE INVENTION

This invention relates to a pyrotechnical dowel or rivet having a shaft, the front end of which includes a deformation chamber containing a blasting cap and being designed to be anchored in thick walls.

It is known to fashion rivets or dowels as explosive rivets and, respectively, explosive dowels (DOS 2,641,588). In this arrangement, a deformation chamber is located at the front end of a shank and contains a blasting cap. In explosive rivets wherein the front end behind the two parts to be joined is uncovered, triggering of the blasting cap poses no problems since the front end of the explosive rivet is accessible. With an explosive dowel inserted in a blind hole and having a front end that is inaccessible, induction heating is required for triggering the blasting cap. In order to be able to trigger the blasting cap by induction, the spacing between the inducing electromagnet and the blasting cap must not be too large; consequently, the use of such explosive dowels is restricted to those elements to be joined which have thin wall portions. The conventional pyrotechnical dowels are not suited for anchoring in solid stones and concrete.

SUMMARY OF THE INVENTION

The invention is based on the object of providing a pyrotechnical dowel which can be anchored in thick walls.

This object has been attained according to the invention by providing a dowel which has means for transmitting heat or an impact to the blasting cap in the front end from the rear end of the dowel.

The pyrotechnical dowel of this invention has a longitudinal duct through which the blasting cap is accessible to be able to transmit to the blasting cap heat by thermal conduction or an impact and, respectively, vibrations for triggering the blasting cap. After insertion of the dowel in a blind hole, the blasting cap is still accessible from the outside through the longitudinal duct so that the explosive charge can be made to detonate in a simple way.

The dowel of the invention is especially suitable for anchoring in solid stones, hollow masonry, or concrete; the dowel consists preferably of metal. Its triggering can be effected thermally, by individual blows, or by ultrasound. Through the longitudinal duct, an appropriate triggering tool can be placed into touching contact with the rearward end wall of the blasting cap in order to trigger the latter.

The longitudinal duct is preferably provided with an internal thread. This makes it possible to insert and to secure screws in the longitudinal duct. If the shank is slotted in the zone of the longitudinal duct in the longitudinal direction, then by threaded insertion of the screw an additional spreading effect can be achieved so that the holding power of the dowel is further increased.

In accordance with a preferred further development of the invention, an annular retaining wall integrally formed with the shank is arranged between the deformation chamber and the longitudinal duct. This retaining wall has a hole through which a triggering tool can be passed. On the other hand, the retaining wall effects tamping the deformation chamber so that it is ensured that the pyrotechnical charge expands the deformation zone while the shank region disposed therebehind remains undeformed.

The triggering tool to be used with the dowel is accordance with this invention can be an elongated device carrying a heating unit at the front end and being designed in the manner of a soldering gun. Alternatively, an elongated mandrel can also be employed which is struck against the blasting cap. In any event, the triggering tool must have such a length that, at its rearward end, a handle portion still projects past the rear end of the dowel shank when the forward end of the triggering tool abuts against the blasting cap.

BRIEF DESCRIPTION OF THE DRAWINGS

Embodiments of the invention will be described in greater detail below with reference to the accompanying drawings wherein.

DETAILED DESCRIPTION

Figure 1:
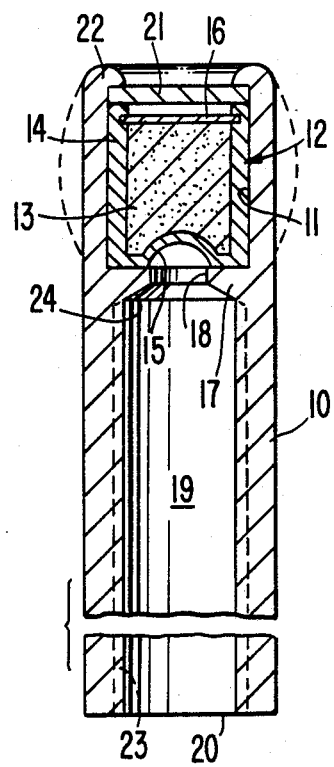
FIG. 1 is a longitudinal section through a first embodiment of the pyrotechnical dowel.

The dowel illustrated in FIG. 1 has a cylindrical shank 10, a deformation chamber 11 being formed at the front end thereof. In the deformation chamber 11, a blasting cap 12 is disposed. The cap comprises a cylindrical case 14 filled with a pyrotechnical charge 13. The case bottom 15 is constructed to have a thinner wall than the peripheral wall of the case 14 and forms an indentation, i.e., it is curved in the direction toward the interior of the case. An open case end facing away from the case bottom 15 is sealed by means of a tamping plate 16.

The blasting cap 12 rests with its rearward end (with the bottom wall 15) on an annular retaining wall or rim 17 integrally molded to the shank 10 and defining the deformation chamber 11 toward the rear. Through the axial aperture 18 in the retaining wall 17, the deformation chamber 11 is in communication with a longitudinal duct 19, which duct extends to the rearward end 20 of the shank 10 and freely terminates at that point.

Toward the front, the deformation chamber 11 is delimited by a disk-shaped cover plate 21 encompassed by the shank wall by flanging portion 22.

The longitudinal duct 19 is provided with an internal thread 23.

During usage of the pyrotechnical dowel, a hole is drilled into the wall in which the dowel is to be mounted, this hole corresponding to the outer diameter of the shank 10. The dowel is inserted in this hole. Subsequently, a rod-shaped triggering device carrying a heating unit at its forward end is introduced into the longitudinal duct 19. The heating unit advances through the aperture 18 up to the case bottom 15, during which step the heating unit is guided by the inclined annular surface 24 of the retaining wall into the hole 18. The hot tip of the triggering tool (not shown) brings about triggering of the pyrotechnical charge 13 by direct contact with the case bottom 15, during which process the wall of the deformation chamber 11 expands a illustrated in dashed lines in FIG. 1. An almost plastic adaptation of the metal of the deformation chamber to the surrounding material takes place during this procedure. On account of the pyrotechnical expansion of the deformation chamber, a firm hold of the dowel in the wall is obtained. This hold can be further enhanced by providing that the dowel is spreadable in the zone of the internal thread 23 and is expanded by threaded insertion of the screw bolt (not shown).

Figure 2:
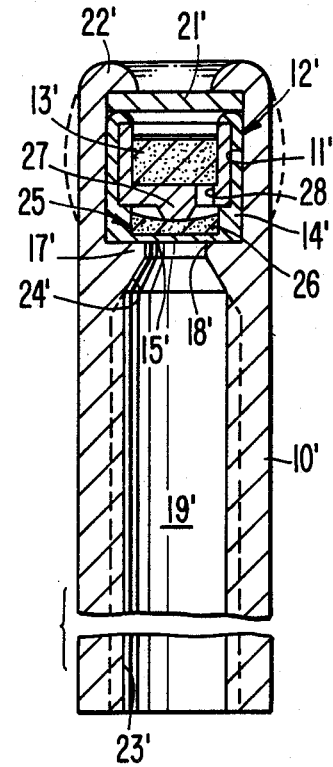
FIG. 2 is a longitudinal section through a second embodiment of the dowel with primer cap.

The embodiment of FIG. 2 corresponds essentially to that of FIG. 1 so that the following description is limited to explanation of the differences.

According to FIG. 2, the blasting cap 12' contains, besides the pyrotechnical charge 13', a primer cap 25 with an initiating charge 26 arranged on the flat case bottom 15'; by indenting the case bottom 15', this initiating charge is urged against an abutment 27. The interior of the primer cap 25 is connected via a bore 28 to the space containing the charge 13'. Upon a blow exerted on the case bottom 15, the initiating charge 26 is ignited by a pressure effect. The initiating charge 26, in turn, thermally ignites the main charge 13' through the bore 28.

During use of the dowel according to FIG. 2, a mandrel is inserted in the longitudinal duct 19' after the dowel has been inserted in a corresponding drilled hole in the wall. After the forward end of the mandrel has reached the case bottom 15', a blow is imparted to the mandrel by means of a hammer or the like, whereby the primer cap 25 is ignited. Thereby, the charge 13' is made to detonate, and the deformation chamber 11' is expanded.

Alternatively, there is the possibility of igniting the dowel of FIG. 2 by means of an appropriate triggering tool exhibiting an ultrasonic head.

The charge, 13' can contain, for example, the following composition:
Tetrazine: 5-25% by weight
Nitrocellulose: 5-25% by weight
Nitromannite: 5-25% by weight
Aluminum grit: 40-80% by weight
Iron powder: 40-80% by weight.

Figure 3A:
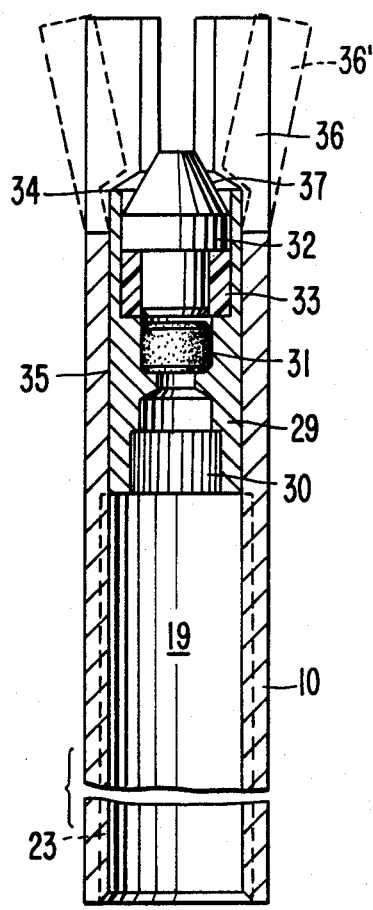
FIG. 3(a) is a longitudinal section through another embodiment with a drive cone and associated fingers which are spread apart by the drive cone and FIG. 3(b) is a plan view of the forward end of this embodiment of the dowel.
Figure 3B:
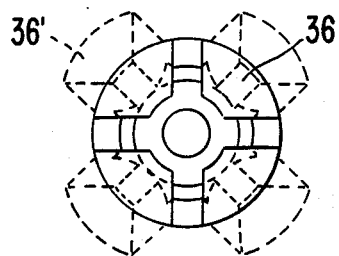

In the other embodiment shown in FIGS. 3(a) and 3(b), a deformation chamber or expansion zone is provided at the forward end of the dowel by an arrangement of spreading segments or fingers and a movable drive cone. A carrier or sleeve 29 is inserted into the dowel body or shank 10'. The carrier 29 contains an explosive charge 30,31 and drive cone 32 with a sealing sleeve 33. A prefabricated assembly including carrier 29 is pressed against a surrounding edge 34 and permanently joined to the dowel body 10' at the circumferential area 35 by virtue of its larger dimensions. The carrier 29 is provided with a large bore at one end and with a series of interconnected smaller bores or chambers extending from the other end to the large bore, a shoulder being formed at the bottom of the large bore for supporting the sleeve 33. The prefabricated assembly including the carrier is prefabricated as follows: first, an explosive charge 31 in the form of a tablet is inserted at the forward end. Then, the drive cone 32 with sealing sleeve 33 mounted on it, is inserted. Sealing sleeve 33, preferably an injection-molded part made of plastic, prevents pressure loss during operation and simultaneously assures guidance of the drive cone 32, preferably made of metal, in carrier 29. Finally, percussion cap 30 is pressed into place at the lower or rear end of the carrier.

This embodiment is used analogously to the embodiment shown in FIG. 2, i.e. an elongated tool is inserted into the longitudinal duct 19', the tool having a striker or triggering head at the forward end. The striker triggers the percussion cap 30 when struck by a hammer, for example. The percussion cap 30 ignites the explosive charge 31. The resultant gas pressure forces the drive cone 32 out of carrier 29 and spreads dowel segments or fingers 36 radially by means of its conical surface 37; the surface contacting lower internal sloped surfaces of fingers or segments 36. Additionally, the percussion cap operates to prevent explosive gases from discharging through the longitudinal duct thereby insuring that the explosive gases expand away from the longitudinal duct to push the drive cone into the spreadable segments.

Reference numeral 36' shows the spread dowel segments after the dowel has performed its anchoring function; it will be appreciated that the segments are integral with the dowel body 10' and that the body has a thicker wall portion surrounding the carrier 29. In this embodiment, the upper portion of the carrier, the drive cone and segments or fingers form an expansion zone or deformation chamber which, upon outward movement of the drive cone and spreading of the fingers operates to expand the forward end of the dowel and to anchor it within the stone, concrete, or like structure.

Figure 4:
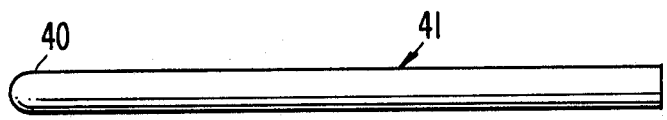
FIG. 4 is a longitudinal view of a triggering tool to be used with the pyrotechnical dowel.

One embodiment of the triggering tool is shown in FIG. 4 wherein reference numeral 40 designates the forward end of an elongated tool 41 adapted to be inserted into a longitudinal duct of a dowel as shown in FIGS. 1, 2 and 3(a).

What is claimed is:

1. A pyrotechnical dowel comprising a shank or body having means at a front end for defining a deformation chamber and an explosive charge located within said chamber; the shank having a longitudinal duct extending from an opening at the rear end of the dowel towards the deformation chamber; said explosive charge having a portion which faces towards the longitudinal duct and which is adapted to be ignited by means inserted within said longitudinal duct; said means for defining the deformation chamber including a wall forming member arranged between the deformation chamber and the longitudinal duct, said member including an opening for allowing ignition of said explosive charge via the means inserted within said longitudinal duct and said shank having a plurality of spreadable segments at the front end, said segments being spread outwardly from the shank upon ignition of said explosive charge and enlargement of said deformation chamber; said wall forming member comprising a carrier inserted into the forward end of the dowel, said carrier containing the portion of the explosive charge and a drive cone with an associated sealing sleeve; ignition of said explosive charge causing movement of the drive cone against the spreadable segments.

2. A pyrotechnical dowel according to claim 1, in combination with said means inserted within said longitudinal duct, said means inserted within said longitudinal duct comprising an elongated triggering tool having means at its front end for effecting ignition of said explosive charge.

3. A pyrotechnical dowel comprising a shank having means at a front end for defining a deformation chamber and an explosive charge located within said chamber;

the shank having a longitudinal duct extending from a rearward end of the dowel towards the deformation chamber; said means for defining the deformation chamber including a carrier inserted into the front end of the dowel, said carrier containing the explosive charge and a drive cone with an associated sealing sleeve at one end of the carrier, the other end of the carrier including a percussion or blasting cap; and said shank having at a front end a plurality of spreadable segments operatively associated with the drive cone whereby upon ignition of the percussion cap by insertion of a tool in the longitudinal duct, the percussion cap ignites the explosive charge and resultant gas pressure forces the drive cone out of the carrier and spreads the segments radially by means of a conical surface of the drive cone, thereby expanding the front end of the dowel.

4. A pyrotechnical dowel according to claim 3, wherein the percussion cap operates to prevent explosive gases from discharging through the longitudinal duct thereby insuring that the explosive gases expand away from the longitudinal duct to push the drive cone into the spreadable segments.

* * * * *